Figure 1:
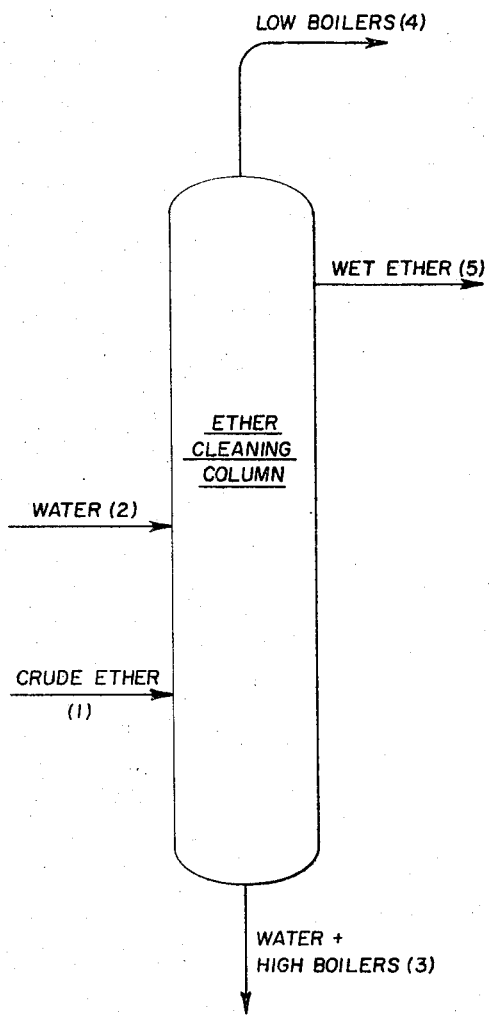

United States Patent [19]

Statman et al.

[11] 3,847,756

[45] Nov. 12, 1974

[54] RECOVERY OF DIETHYL ETHER FROM AN OLEFIN HYDRATION PRODUCT STREAM BY EXTRACTIVE DISTILLATION WITH WATER

[75] Inventors: Max Statman, Longview; Ralph E. Page, Jr., White Oak, both of Tex.

[73] Assignee: Eastman Kodak Company, Rochester, N.Y.

[22] Filed: Nov. 9, 1972

[21] Appl. No.: 305,199

[52] U.S. Cl.............. 203/92, 203/96, 260/616, 260/643 D
[51] Int. Cl............................................... B01d 3/10
[58] Field of Search............ 260/616, 643 D, 643 R; 203/96, 92, 93, 97

[56] References Cited
UNITED STATES PATENTS

| | | | |
|---|---|---|---|
| 3,408,267 | 10/1968 | Miller et al. | 260/643 D |
| 2,610,141 | 9/1952 | Drout | 203/96 |
| 2,648,711 | 8/1953 | Carrier | 203/96 |
| 2,806,816 | 9/1957 | Staib | 260/643 D |
| 3,445,345 | 5/1969 | Katzen | 260/643 D |

FOREIGN PATENTS OR APPLICATIONS

| | | | |
|---|---|---|---|
| 625,695 | 8/1961 | Canada | 260/643 D |
| 614,470 | 2/1961 | Canada | 260/616 |

Primary Examiner—Norman Yudkoff
Assistant Examiner—Frank Sever
Attorney, Agent, or Firm—Edward R. Weber; Cecil D. Quillen, Jr.

[57] ABSTRACT

This invention relates to a process for the purification of diethyl ether whereby an impure stream of diethyl ether is fed into a distillation column at a point about one-third above the bottom of the column. An approximately equal volume of water is introduced in the column at a point about two-thirds above the bottom of the column. A stream of essentially pure diethyl ether is removed from the column at a point about five-sixths above the bottom of the column. Low boiling impurities are removed from the top of the column and water containing ethyl alcohol and high boiling impurities is removed from the bottom of the column.

7 Claims, 1 Drawing Figure

RECOVERY OF DIETHYL ETHER FROM AN OLEFIN HYDRATION PRODUCT STREAM BY EXTRACTIVE DISTILLATION WITH WATER

The present invention relates to a process for purification of diethyl ether contained in an impure product stream contaminated with ethyl alcohol, water, butene, secondary butanol, and other like contaminants. More particularly, the present invention relates to the process for purification of such an impure stream of diethyl ether through the use of a single-column purification process.

In the preparation of ethyl alcohol by olefin hydration, a typical byproduct is diethyl ether. This ether requires separation and purification before it can be recycled to the reactor to aid in reaction control. Similarly, diethyl ether manufactured by the dehydration of ethyl alcohol contains impurities which must be removed before the ether may be considered pure. These impurities typically include ethyl alcohol, water, various butenes, secondary butanol, and other like organic materials. Because of the similar properties of these materials, separation by fractional distillation or other simple, conventional procedures is not possible.

A conventional prior art process for the purification of diethyl ether will utilize a multi-column distillation train in conjunction with water washing and washing with a permanganate solution. A typical flow sheet for such a purification process is given by Dr. A. P. Lurie in the *Encyclopedia of Chemical Technology*, Second Edition, Vol. 8, p. 482 (1965). Obviously, such techniques requiring extensive equipment and multiple processing steps add to manufacturing costs both in the areas of required facilities and in direct operating costs.

Therefore, an object of this invention is to provide a simplified method for the purification of diethyl ether.

Another object of this invention is to provide a process for purification of diethyl ether which utilizes only one purification column.

Other objects and advantages of the invention will become apparent from a consideration of the specification and claims of this application.

According to the process of this invention, an impure stream containing diethyl ether contaminated with various other compounds as previously outlined, is fed into a distillation column at a point about one-third of the way up the column from the bottom. An approximately equal flow volumn of water is fed into the column at a point about two-thirds of the way up the column from the bottom. The amount of water used can vary from about 75 percent to about 300 percent of the volume of the impure feed. Very good results are obtained when the amount is about 100 percent. A stream of substantially pure diethyl ether is removed at a point about five-sixths of the way up the column from the bottom, low boiling impurities are removed from the top of the column and water, ethyl alcohol, and high boiling impurities are removed from the bottom of the column. The positional designation of feed and take-off points, i.e., one-third of the way up the column from the bottom, two-thirds of the way up the column from the bottom, etc., are determined with relation to the theoretical distillation trays of the column. For a column of uniform linear cross-section and uniform internal construction, a point one-third of the way from the bottom, linearly, will coincide with a point one-third of the way from the bottom in terms of theoretical distillation trays. For a column of nonuniform construction, however, the particular feed or takeoff point is determined with relation to the number of theoretical distillation trays, thus the ether feed point would be one-third of the theoretical distillation trays from the bottom of the column, the water feed point would be two-thirds of the theoretical distillation trays from the bottom of the column, and the wet ether take-off would be five-sixths of the theoretical distillation trays above the bottom of the column.

To aid in better understanding the invention, attention is called to FIG. 1, which represents a conventional distillation column. A feed stream 1, comprising crude ether contaminated with ethyl alcohol, water, secondary butanol, butenes and other impurities produced in the synthesis process, is introduced at a point one-third of the theoretical distillation trays up from the bottom of the column. A water stream 2 equal to from about 75 percent to about 300 percent of the quantity of the crude feedstream is introduced into the column at a point about two-thirds of the theoretical distillation trays up the column from the bottom. A stream 3 consisting of water, ethyl alcohol, and high-boiling impurities is removed from the bottom of the column. A stream 4 comprising low-boiling impurities is removed from the top of the column, and a stream 5 consisting essentially of water-saturated ether is removed at a point five-sixths of the theoretical distillation trays up from the bottom of the column.

The distillation column in which the purification takes place may be of conventional design and is provided with a heating means at the base and a condenser system at the top. The column may be provided with trays to effect the fractionation, or it may be random filled with packing bodies such as Raschig rings, saddles, or other suitable shapes made of any desired material.

The unexpectedness of the results obtained with the process of this invention is illustrated by the fact that laboratory studies of methods of purifying the ether by distillation utilizing a column containing 120 Oldershaw trays and a reflux ratio of 9:1, produced an ether which contained several tenths of a percent of ethyl alcohol. Likewise, when water was introduced into such a column utilizing conventional extractive distillation techniques wherein water is fed at the top of the column, similar results were obtained. In contrast to this, with the process of the instant invention, a column containing only 60 trays and a reflux ratio of from about 1.5:1 to about 4:1 and preferably about 2.5:1, the recovered ether stream contains less than 0.1 percent ethyl alcohol. By the term reflux ratio we mean the ratio of ether vapor flow up the column to ether removed from the column. Thus, it was totally unexpected that a substantially pure stream of diethyl ether could be obtained by introducing an extractant at a point substantially below the top of the column and removing the stream of product diethyl ether at a point intermediate between the top of the column and the point wherein the extractive liquid is introduced. Likewise, it could not be predicted that acceptable purification could be obtained in the relatively short 60 tray column utilizing the process of the invention, when an unacceptable product was obtained in a 120 tray column using conventional distillation or extractive distillation techniques.

The practice of the instant invention greatly simplifies the recovery of purified ether from crude ether containing impurities as previously mentioned. Only a single extractive distillation column is required. No additional water or permanganate washes are needed. The reduction in the required reflux ratio produces a savings in steam and water usage. In addition, the invention can be operated at pressures other than atmospheric when this facilitates further processing. For example, by operating the purification column at 50 psig pressure, normal plant cooling water can be used in the condensers rather than a refrigerated coolant. The water-saturated ether from the purification column can then flow through a drying unit such as a conventional caustic scrubber without requiring additional pumps, and the ether leaving the drying column can likewise be condensed utilizing normal cooling water.

The process of this invention is illustrated in greater detail by the following examples, but it will be understood that these examples are not intended to limit the invention in any way and obvious modifications will occur to those skilled in the art.

EXAMPLE 1

This example shows the practice of the invention. A 1-inch diameter distillation column consisting of several sections of Oldershaw glass distillation columns combined to give a total of 60 trays is used. The feed stream enters at a point 20 trays above the base. The water enters at a point 20 trays above the feed tray. Wet ether leaves the column 10 trays above the water feed point and the low boilers are removed from the top which is 10 trays above the ether take-off point.

The ether is fed to the column at a rate of 247.8 grams per hour. This stream contains 113.35 grams per hour diethyl ether, 72.96 grams per hour water, 60.97 grams per hour ethyl alcohol, 0.31 grams per hour high boilers, and 0.2 grams per hour butenes. The column is operated at atmospheric pressure. Water is added at a rate of 312 grams per hour at the water feed point. The base of the column is at 92°C. Temperature at the ether feed plate is 65°C. and the temperature is 36°C. at the water feed point. The ratio of ether boiling up the column to ether take-off (reflux ratio) is 2:1. The ether being removed is essentially free (99.95 percent) of all impurities except water. When this ether is washed with a 50 weight percent solution of sodium hydroxide in water, the water content is lowered to less than 0.02 weight percent water.

EXAMPLE 2

This example demonstrates pressure operation. This purification is carried out in a 1.5-foot diameter packed column at 40 psig pressure. The crude ether enters 16 feet above the base. The water enters 16 feet above the ether feed. Wet ether leaves the column 8 feet above the water feed point. The low boilers are removed at the top of the column which is 8 feet above the ether take-off point.

The crude ether is fed to the column at a rate of 3,010.0 pounds per hour. This stream contains 3.01 pounds per hour low boilers, 19.8 pounds per hour ethylene, 1,465.27 pounds per hour diethyl ether, 915.04 pounds per hour ethyl alcohol, 602.90 pounds per hour water, and 3.92 pounds per hour high boilers. The water is fed to the column at a rate of 3,502 pounds per hour. The base of the column is at 131°C. The temperature at the ether feed point is 104°C. and the temperature is 76°C. at the water feed point. The reflux ratio is 4:1. The ether product stream contains 1.15 pounds per hour low boilers, 1,453.65 pounds per hour ether, 0.80 pound per hour ethyl alcohol, 39.5 pounds per hour water, and 0.2 pound per hour high boilers. Thus, in excess of 99 percent of the ether fed is recovered in the product stream and on a water-free basis the product ether is 99.8 percent pure.

EXAMPLE 3

This example illustrates the purification obtained by conventional distillation. A 1-inch diameter distillation column consisting of several sections of Oldershaw glass distillation columns combined to give a total of 90 trays is used. A feed stream such as described in Example 1 is fed at a point 45 trays above the base. The feed rate is 250 grams per hour. The column is operated at a reflux ratio of 15:1. The overhead from this column is diethyl ether containing 4.7 weight percent ethyl alcohol, 0.2 weight percent butenes and 0.05 weight percent high boilers.

EXAMPLE 4

This example illustrates the purification obtained by conventional extractive distillation. A column as described in Example 1 is operated in the same manner excepting that the water being added is added at the top of the column rather than at a point 20 plates below the top. The ether being removed at the top contains 0.3 weight percent ethyl alcohol and 0.2 weight percent butenes.

The invention has been described in detail with particular reference to certain preferred embodiments thereof, but it will be understood that variations and modifications can be made within the spirit and scope of the invention as described hereinabove.

We claim:
1. A process for purification of diethyl ether which comprises:
   1. feeding an impure stream comprising diethyl ether, ethyl alcohol, water, butene, secondary butanol and other impurities normally associated with crude diethyl ether into an extractive distillation column at a point about one-third of the way, in terms of theoretical distillation trays, up from the bottom of the column;
   2. feeding a quantity of water about equal to from about 75 percent to about 300 percent of the quantity of the crude feed stream into the column at a point about two-thirds of the way, in terms of theoretical distillation trays, up the column from the bottom; and
   3. recovering a substantially pure stream of wet diethyl ether from a point about five-sixths of the way, in terms of theoretical distillation trays, up the column from the bottom.

2. The process of claim 1 wherein the purification column is operated at atmospheric pressure.

3. The process of claim 1 wherein the purification column is operated at a pressure greater than atmospheric.

4. The process of claim 1 wherein the quantity of water is about equal to 100 percent of the quantity of the crude feed stream.

5. The process of claim 1 wherein the distillation column is operated at a reflux ratio of from about 1.5:1 to about 4:1.

6. The process of claim 5 wherein the reflux ratio is about 2.5:1.

7. The process of claim 1 wherein the low boiling impurities are removed from the top of the distillation column and water containing high boiling impurities is removed from the bottom of the distillation column.

* * * * *